United States Patent
Baker et al.

(10) Patent No.: US 12,414,588 B2
(45) Date of Patent: Sep. 16, 2025

(54) ELECTRONIC VAPOR PROVISION SYSTEM

(71) Applicant: NICOVENTURES TRADING LIMITED, London (GB)

(72) Inventors: Darryl Baker, London (GB); Ross Oldbury, London (GB)

(73) Assignee: NICOVENTURES TRADING LIMITED, London (GB)

( * ) Notice: Subject to any disclaimer, the term of this patent is extended or adjusted under 35 U.S.C. 154(b) by 2148 days.

(21) Appl. No.: 15/764,227

(22) PCT Filed: Aug. 30, 2016

(86) PCT No.: PCT/GB2016/052679
§ 371 (c)(1),
(2) Date: Mar. 28, 2018

(87) PCT Pub. No.: WO2017/055793
PCT Pub. Date: Apr. 6, 2017

(65) Prior Publication Data
US 2018/0271155 A1    Sep. 27, 2018

(30) Foreign Application Priority Data
Sep. 28, 2015 (GB) ..................................... 1517086

(51) Int. Cl.
*A24F 40/53* (2020.01)
*A24B 15/167* (2020.01)
(Continued)

(52) U.S. Cl.
CPC ............ *A24F 40/53* (2020.01); *A24B 15/167* (2016.11); *A24F 15/01* (2020.01); *A24F 40/50* (2020.01);
(Continued)

(58) Field of Classification Search
None
See application file for complete search history.

(56) References Cited

U.S. PATENT DOCUMENTS

| | | |
|---|---|---|
| 2011/0265806 A1 | 11/2011 | Alarcon et al. |
| 2013/0276799 A1 | 10/2013 | Davidson et al. |
| (Continued) | | |

FOREIGN PATENT DOCUMENTS

| | | |
|---|---|---|
| CN | 102832669 A | 12/2012 |
| CN | 103798960 A | 5/2014 |
| (Continued) | | |

OTHER PUBLICATIONS

Ng, Kong Soon, "Enhanced coulomb counting method for estimating state-of-charge and state-of-health of lithium-ion batteries," Published Jan. 8, 2009, Applied Energy 86 (2009) 1506-1511. <https://www.sciencedirect.com/science/article/pii/S0306261908003061> (Year: 2009).*

(Continued)

*Primary Examiner* — Philip Y Louie
*Assistant Examiner* — Sonny V Nguyen
(74) *Attorney, Agent, or Firm* — Burr & Forman (57) ABSTRACT

An electronic vapor provision system includes a control unit including: a battery for providing electrical power to a heater which is used to produce vapor, and a controller. The controller is configured to collect information, during user operation of the electronic vapor provision system, relating to: power consumption from the battery due to operation of the heater to produce vapor, and re-charging of the battery. The controller is further configured to maintain a model of power consumption from the battery by the electronic vapor provision system and of the timings of re-charging the battery, wherein the model is formed or updated from the collected information. The model is further configured to (Continued)

predict from the model whether an estimated power consumption from the battery by the electronic vapor provision system will discharge down to a threshold level of charge before an estimated next re-charging time, and if so, perform a user notification and/or mitigation action in response to the prediction.

26 Claims, 4 Drawing Sheets

(51) Int. Cl.
  *A24F 15/01* (2020.01)
  *A24F 40/50* (2020.01)
  *A24F 40/60* (2020.01)
  *A24F 40/65* (2020.01)
  *A24F 40/90* (2020.01)
  *A24F 47/00* (2020.01)
  *H02J 7/00* (2006.01)
  *A24F 40/10* (2020.01)

(52) U.S. Cl.
  CPC .............. *A24F 40/60* (2020.01); *A24F 40/65* (2020.01); *A24F 40/90* (2020.01); *A24F 47/00* (2013.01); *H02J 7/0068* (2013.01); *A24F 40/10* (2020.01)

(56) References Cited

U.S. PATENT DOCUMENTS

| 2013/0284192 | A1 | 10/2013 | Peleg et al. | |
|---|---|---|---|---|
| 2014/0014125 | A1* | 1/2014 | Fernando | A24F 40/50 131/328 |
| 2014/0083443 | A1 | 3/2014 | Liu | |
| 2014/0123990 | A1 | 5/2014 | Timmermans | |
| 2014/0174459 | A1 | 6/2014 | Burstyn | |
| 2015/0027472 | A1 | 1/2015 | Amir | |
| 2015/0101625 | A1* | 4/2015 | Newton | A24F 40/60 131/329 |
| 2015/0128966 | A1 | 5/2015 | Lord | |
| 2015/0142387 | A1 | 5/2015 | Alarcon et al. | |
| 2015/0224268 | A1* | 8/2015 | Henry | G06Q 30/00 128/202.21 |
| 2015/0272223 | A1* | 10/2015 | Weigensberg | A24F 40/53 131/328 |
| 2015/0320116 | A1 | 11/2015 | Bleloch et al. | |
| 2016/0309390 | A1* | 10/2016 | Yi | H04W 40/10 |
| 2017/0258136 | A1* | 9/2017 | Hawes | A24F 40/53 |

FOREIGN PATENT DOCUMENTS

| CN | 203913385 U | 11/2014 |
|---|---|---|
| CN | 204070537 U | 1/2015 |
| CN | 104540405 A | 4/2015 |
| CN | 204599331 U | 9/2015 |
| EP | 2725681 A2 | 4/2014 |
| GB | 2502054 A | 11/2013 |
| JP | H08293328 A | 11/1996 |
| JP | 2004097617 A | 4/2004 |
| JP | 2014513877 A | 6/2014 |
| KR | 20150084541 A | 7/2015 |
| WO | WO-2014043887 A1 | 3/2014 |
| WO | WO-2014150704 A2 | 9/2014 |
| WO | WO-2014190079 A2 | 11/2014 |
| WO | WO-2015189556 A1 | 12/2015 |

OTHER PUBLICATIONS

Decision to Grant a Patent for Japanese Application No. 2018-515941, dated Jul. 23, 2019, 5 pages.
Grant of Patent for Korean Application No. 10-2018-7008848, dated Feb. 27, 2020, 4 pages.
"IEEE Standard for Information Technology—Telecommunications and Information Exchange Between Systems Local and Metropolitan Area Networks, Specific Requirements Part 11: Wireless LAN Medium Access Control (MAC) and Physical Layer (PHY) Specifications," IEEE Std 802.11-2012 (Revision of IEEE Std 802.ii-2007), Mar. 29, 2012, pp. 1-72,382-384, 405-406, 413-424, 824-827, 840, 1016-1018 (97 pages).
International Preliminary Report on Patentability for Application No. PCT/GB2016/052679, mailed Apr. 12, 2018, 6 pages.
International Search Report and Written Opinion for Application No. PCT/GB2016/052679, mailed Nov. 14, 2016, 7 pages.
Office Action for Chinese Application No. 201680056375.7 mailed on Mar. 3, 2020, 11 pages.

* cited by examiner

ELECTRONIC VAPOR PROVISION SYSTEM

PRIORITY CLAIM

The present application is a National Phase entry of PCT Application No. PCT/GB2016/052679, filed Aug. 30, 2016, which claims priority from GB Patent Application No. 1517086.3, filed Sep. 28, 2015, each of which is hereby fully incorporated herein by reference.

FIELD

The present disclosure relates to an electronic vapor provision system, e.g. an e-cigarette, and to a control unit for such a system.

BACKGROUND

Electronic vapor provision systems such as e-cigarettes and other electronic nicotine delivery systems generally contain a cartridge to provide a reservoir of liquid which is to be vaporized, typically containing nicotine. When a user inhales on the device, a control unit operates a battery to provide power to a heater. This activates the heater to vaporize a small amount of liquid, which is then inhaled by the user.

This type of e-cigarette therefore generally incorporates two consumables, firstly the liquid to be vaporized, and secondly power in the battery. Regarding the former, once the reservoir of liquid has been exhausted, at least a portion of the device containing the cartridge may be discarded to allow replacement with a new cartridge. Regarding the latter, an e-cigarette usually provides some form of electrical connector to receive power from an external charging device, thereby allowing the battery within the e-cigarette to be re-charged.

Most e-cigarettes are powered by re-chargeable lithium ion batteries (or cells), which are to be found in a very widespread range of devices, not just e-cigarettes. (N.B. the terms "battery" and "cell" will be used inter-changeably herein, since due to the limited space within an e-cigarette, the battery in such an e-cigarette usually comprises just a single cell.) Conventional lithium ion batteries used in e-cigarettes typically have an energy storage capacity in the range 70-3500 mAh, depending on the size of device, etc. Such batteries produce a voltage output that tends to decline as the battery discharges, for example, from about 4.2V when fully charged, down to about 3.6V just before being fully discharged, i.e. a decline of about 14%. Furthermore, since the power output across a given heating resistor R goes with $V^2/R$, this implies that there would generally be a corresponding drop in power output such that the final operational power output (at a voltage of 3.6V) is only 73% of the initial power output (at a voltage of 4.2V). This change in power supplied by the battery to the heater, from being fully charged to being nearly discharged, can therefore significantly impact the amount of liquid vaporized, and hence inhaled by a user.

Some e-cigarettes may try to compensate for the loss of voltage, for example, by drawing extra current from the battery (such as by using pulse-width modulation, PWM). However, this type of approach may drain the battery more quickly, whereby the user ends up unexpectedly and inconveniently with a fully discharged e-cigarette.

SUMMARY

An electronic vapor provision system comprises a control unit including: a battery for providing electrical power to a heater which is used to produce vapor, and a controller. The controller is configured to collect information, during user operation of the electronic vapor provision system, relating to: (i) power consumption from the battery due to operation of the heater to produce vapor, and (ii) re-charging of the battery. The controller is further configured to maintain a model of power consumption from the battery by the electronic vapor provision system and of the timings of re-charging the battery, wherein said model is formed or updated from said collected information. The model is further configured to predict from the model whether an estimated power consumption from the battery by the electronic vapor provision system will discharge down the a threshold level of charge before an estimated next re-charging time, and if so, perform a user notification and/or mitigation action in response to said prediction.

In some implementations, the model may be run on an external device, such as a smart-phone or server.

BRIEF DESCRIPTION OF THE DRAWINGS

Various embodiments of the disclosure will now be described in detail by way of example only with reference to the following drawings.

DETAILED DESCRIPTION

As described above, the present disclosure relates to an electronic vapor provision system, such as an e-cigarette. Throughout the following description the term "e-cigarette" is used; however, this term may be used interchangeably with electronic vapor provision system, electronic aerosol delivery system, and other similar expressions.

Figure 1:
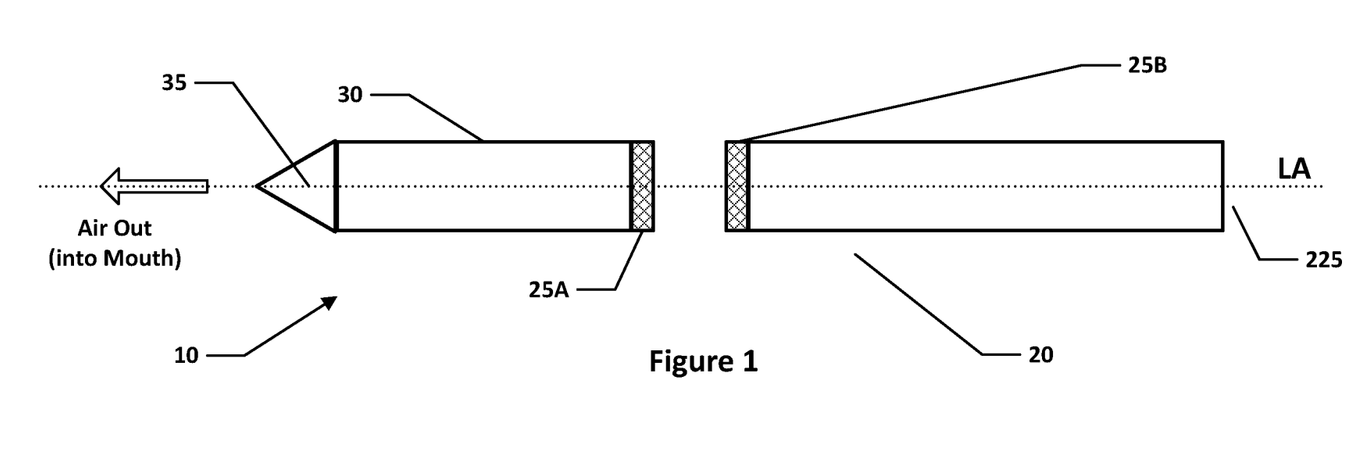
FIG. 1 is a schematic (exploded) diagram of an e-cigarette in accordance with some embodiments of the disclosure.

FIG. 1 is a schematic (exploded) diagram of an e-cigarette 10 in accordance with some embodiments of the disclosure (not to scale). The e-cigarette 10 has a generally cylindrical shape, extending along a longitudinal axis indicated by dashed line LA, and comprises two main components, namely a body 20 and a cartomizer 30. The cartomizer 30 includes an internal chamber containing a reservoir of liquid, a vaporizer (such as a heater), and a mouthpiece 35. The liquid in the reservoir typically includes nicotine in an appropriate solvent, and may include further constituents, for example, to aid aerosol formation, and/or for additional flavoring. The reservoir may include a foam matrix or any other structure for retaining the liquid until such time that it is required to be delivered to the vaporizer. The cartomizer 30 may further include a wick or similar facility to transport a small amount of liquid from the reservoir to a heating location on or adjacent the heater. The control unit 20 includes a re-chargeable cell or battery to provide power to the e-cigarette 10 and a circuit board for generally controlling the e-cigarette 10. When the heater receives power from the battery, as controlled by the circuit board, the heater vaporizes the liquid from the wick and this vapor is then inhaled by a user through the mouthpiece 35.

The control unit 20 and cartomizer 30 are detachable from one another by separating in a direction parallel to the longitudinal axis (LA) of the e-cigarette 10, as shown in FIG. 1, but are joined together when the device 10 is in use by a connection, indicated schematically in FIG. 1 as 25A and 25B, such as a bayonet or screw fitting. This connection provides mechanical and electrical connectivity between the body 20 and the cartomizer 30. The electrical connector on the body 20 that is used to connect to the cartomizer 30 may also serve as a socket for connecting a charging device (not shown) when the body 20 is detached from the cartomizer 30. The other end of the charging device can be plugged into a USB socket to re-charge the battery in the control unit of the e-cigarette. In other implementations, a cable may be provided for direct connection between the electrical connector on the body and a USB socket. In other implementations, the re-charging of the battery in the control unit may be performed via the tip end 225 of the e-cigarette 10, i.e. the end opposite to the mouthpiece 35.

The control unit 20 is provided with one or more holes (not shown in FIG. 1) for air inlet. These holes connect to an air passage through the control unit 20 to an air passage provided through the connector 25. This then links to an air path through the cartomizer 30 to the mouthpiece 35. When a user inhales through the mouthpiece 35, air is drawn into the control unit 20 through the one or more air inlet holes, which are suitably located on the outside of the e-cigarette 10. This airflow (or the resulting change in pressure) is detected by a pressure sensor that in turn activates the heater to vaporize the liquid from the reservoir (via the wick). The airflow passes from the control unit 20, through the vaporizer, where it combines with the vapor, and this combination of airflow and (nicotine) vapor then passes through the cartomizer 30 and out of the mouthpiece 35 to be inhaled by a user. The cartomizer 30 may be detached from the body 20 and disposed of when the supply of liquid is exhausted and replaced with another cartomizer, if so desired. (The cartomizer 30 may therefore sometimes be referred to as a disposable component, and the control unit 20 as a re-usable component.) It will be appreciated that the e-cigarette 10 shown in FIG. 1 is presented by way of example, and various other implementations can be adopted. For example, in some embodiments, the cartomizer 30 is provided as two separable components, namely a cartridge comprising the nicotine reservoir and mouthpiece (which can be replaced when the liquid from the reservoir is exhausted), and a vaporizer comprising a heater (which is generally retained). As another example, the charging facility may connect to an additional or alternative power source, such as a car cigarette lighter.

Figure 2:
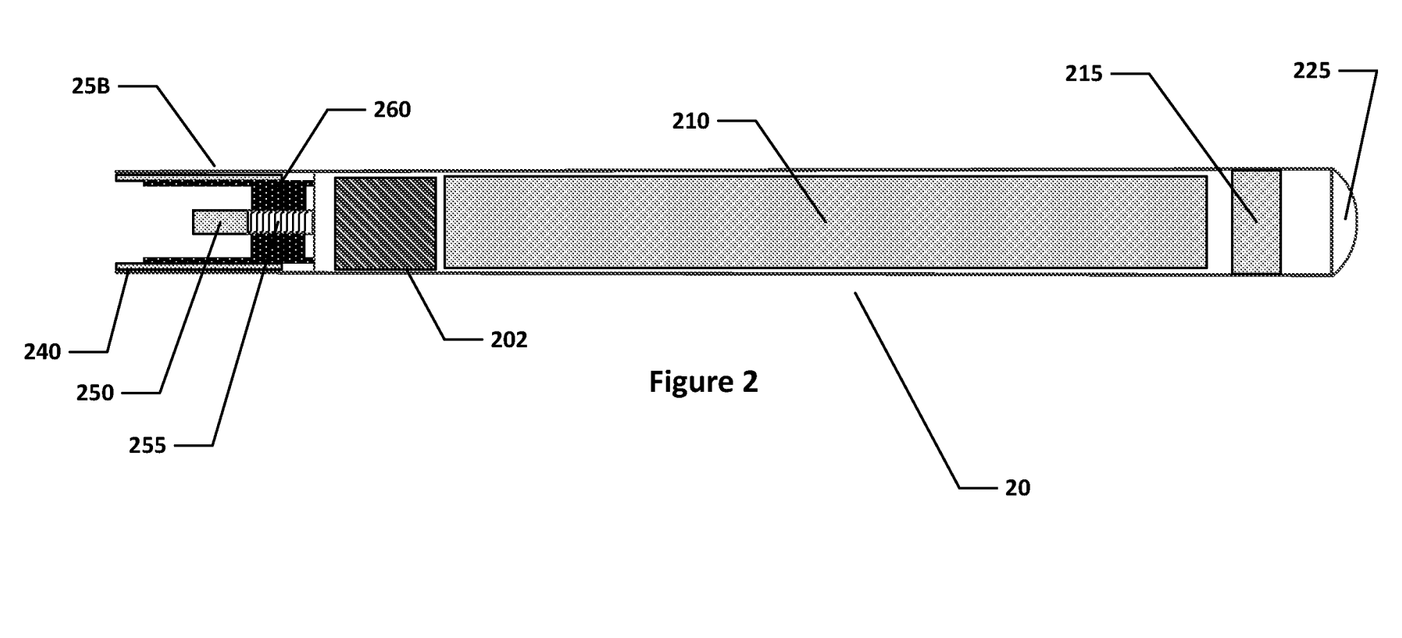
FIG. 2 is a schematic diagram of the body of the e-cigarette of FIG. 1 in accordance with some embodiments of the disclosure.

FIG. 2 is a schematic (simplified) diagram of the control unit 20 of the e-cigarette 10 of FIG. 1 in accordance with some embodiments. FIG. 2 can generally be regarded as a cross-section in a plane through the longitudinal axis LA of the e-cigarette 10. Note that certain components and details of the body 20, e.g. wiring and more complex shaping, have been omitted from FIG. 2 for reasons of clarity.

As shown in FIG. 2, the control unit 20 includes a battery 210 for powering the e-cigarette 10, as well as a printed circuit board (PCB) 202 on which is mounted a chip, such as an application specific integrated circuit (ASIC) or microcontroller, for controlling the e-cigarette 10. The PCB 202 may be positioned alongside or at one end of the battery 210.

In the configuration shown in FIG. 2, the PCB is located between the battery 210 and the connector 25B. The control unit also includes a sensor unit 215 to detect an inhalation on mouthpiece 35. In the configuration shown in FIG. 2, the sensor unit 215 is located between the battery 210 and the tip end 225, but in other implementations, it may be located on or adjacent to PCB 202 (which may be positioned as shown in FIG. 2, or in some other location). In response to such a detection of inhalation, the sensor unit 215 notifies the chip on the PCB 202, which in turn initiates the flow of power from the battery 210 to a heater in the cartomizer 30.

The tip end 225 of the control unit 20 includes a cap to seal and protect the far (distal) end of the e-cigarette 10. There is an air inlet hole provided in or adjacent to the cap to allow air to enter the body 20 and flow past the sensor unit 215 when a user inhales on the mouthpiece 35. This airflow therefore allows the sensor unit 215 to detect the user inhalation. In some implementations, the tip end 225 may be provided with a light, such as a light emitting diode (LED) that is illuminated by the chip in response to the detection of inhalation by the sensor unit 225. The tip end 225 may also (or alternatively) be provided with an electrical contact (not shown in FIG. 2) to provide an additional connection for re-charging battery 210.

At the opposite end of the body 20 from the tip end 225 is the connector 25B for joining the control unit 20 to the cartomizer 30. As noted above, the connector 25B provides mechanical and electrical connectivity between the control unit 20 and the cartomizer 30. As shown in FIG. 2, the connector 25B includes a body connector 240, which is metallic (silver-plated in some embodiments) to serve as one terminal for electrical connection (positive or negative) to the cartomizer 30. The connector 25B further includes an electrical contact 250 to provide a second terminal for electrical connection to the cartomizer 30 of opposite polarity to the first terminal, namely body connector 240. The connector 240 generally has an annular ring shape, while contact 250 is located in the center of this ring (when seen in a plane which is perpendicular to the longitudinal axis, LA, of the e-cigarette 10).

The electrical contact 250 is mounted on a coil spring 255. When the control unit 20 is attached to the cartomizer 30, the connector 25A on the cartomizer 30 pushes against the electrical contact 250 in such a manner as to compress the coil 255 spring in an axial direction, i.e. in a direction parallel to (co-aligned with) the longitudinal axis LA. In view of the resilient nature of the spring 255, this compression biases the spring 255 to expand, which has the effect of pushing the electrical contact 250 firmly against connector 25A, thereby helping to ensure good electrical connectivity between the control unit 20 and the cartomizer 30. The body connector 240 and the electrical contact 250 are separated by a trestle 260, which is made of a non-conductor (such as plastic) to provide good insulation between the two electrical terminals. The trestle 260 is shaped to assist with the mutual mechanical engagement of connectors 25A and 25B.

Figure 3:
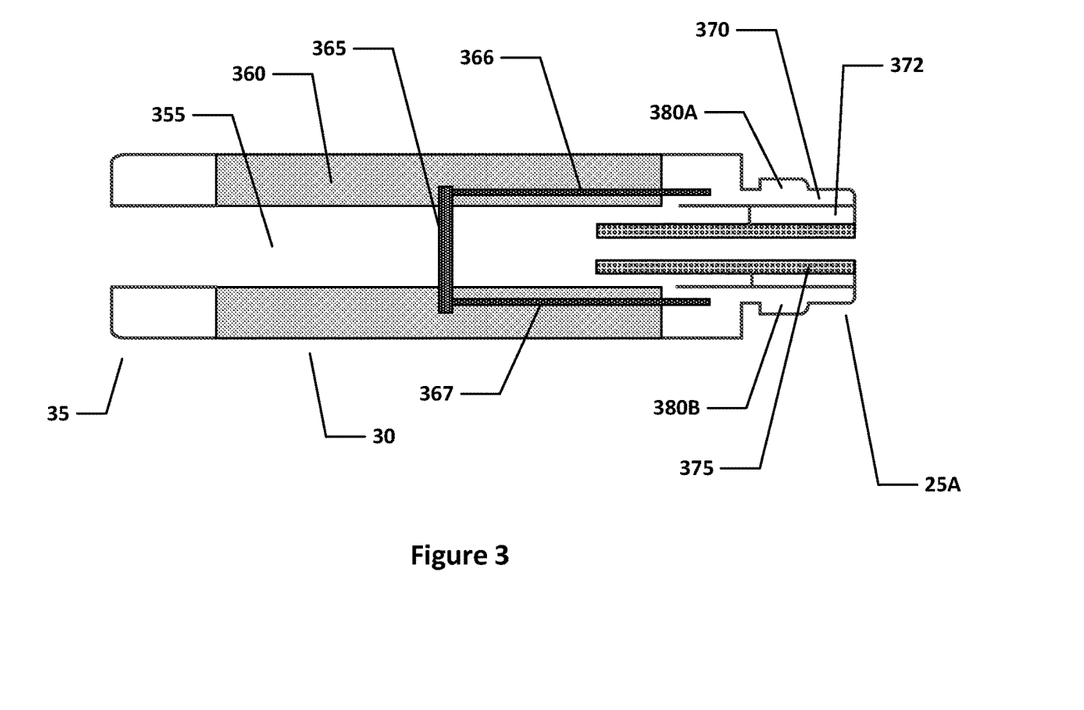
FIG. 3 is a schematic diagram of the cartomizer of the e-cigarette of FIG. 1 in accordance with some embodiments of the disclosure.

FIG. 3 is a schematic diagram of the cartomizer 30 of the e-cigarette 10 of FIG. 1 in accordance with some embodiments of the disclosure. FIG. 3 can generally be regarded as a cross-section in a plane which includes the longitudinal axis LA of the e-cigarette. Note that various components and details of the control unit 20, e.g. wiring and more complex shaping, have again been omitted from FIG. 3 for reasons of clarity.

The cartomizer 30 includes an air passage 355 extending along the central (longitudinal) axis of the cartomizer 30 from the mouthpiece 35 to the connector 25A for joining the cartomizer 30 to the control unit 20. A reservoir of liquid 360 (typically including nicotine in a solvent) is provided around the air passage 335. This reservoir 360 may be implemented, for example, by providing cotton or foam soaked in the liquid. The cartomizer 30 also includes a heater 365 for heating the liquid from reservoir 360 to generate (nicotine-containing) vapor to flow through air passage 355 and out through mouthpiece 35 in response to a user inhaling on the e-cigarette 10. The heater 365 is powered through lines 366 and 367, which are in turn connected to opposing polarities (positive and negative, or vice versa) of the battery 210 via connector 25A. (As noted above, the details of the wiring between the power lines 366 and 367 and connector 25A are omitted from FIG. 3).

The connector 25A includes an inner electrode 375, which may be silver-plated or made of some other suitable metal. When the cartomizer 30 is connected to the control unit 20, the inner electrode 375 contacts the electrical contact 250 of the control unit 20 to provide a first electrical path between the cartomizer 30 and the control unit 20. In particular, as the connectors 25A and 25B are engaged, the inner electrode 375 pushes against the electrical contact 250 so as to compress the coil spring 255, thereby helping to ensure good electrical contact between the inner electrode 375 and the electrical contact 250.

The inner electrode 375 is surrounded by an insulating ring 372, which may be made of plastic, rubber, silicone, or any other suitable material. The insulating ring 372 is surrounded by the cartomizer connector 370, which may be silver-plated or made of some other suitable metal or conducting material. When the cartomizer 30 is connected to the control unit 20, the cartomizer connector 370 contacts the body connector 240 of the control unit 20 to provide a second electrical path between the cartomizer 30 and the control unit 20. In other words, the inner electrode 375 and the cartomizer connector 370 serve as positive and negative terminals (or vice versa) for supplying power from the battery 210 in the control unit to the heater 365 in the cartomizer via supply lines 366 and 367 as appropriate.

The cartomizer connector 370 is provided with two lugs or tabs 380A, 380B, which extend in opposite directions away from the longitudinal axis of the e-cigarette 10. These tabs 380A, 380B are used to provide a bayonet fitting in conjunction with the body connector 240 for connecting the cartomizer 30 to the control unit 20. This bayonet fitting provides a secure and robust connection between the cartomizer 30 and the control unit 20, so that the cartomizer 30 and control unit 20 are held in a fixed position relative to one another, without wobble or flexing, and the likelihood of any accidental disconnection is very small. At the same time, the bayonet fitting provides simple and rapid connection and disconnection by an insertion followed by a rotation for connection, and a rotation (in the reverse direction) followed by withdrawal for disconnection. It will be appreciated that other embodiments may use a different form of connection between the control unit 20 and the cartomizer 30, such as a snap fit or a screw connection.

Figure 4:
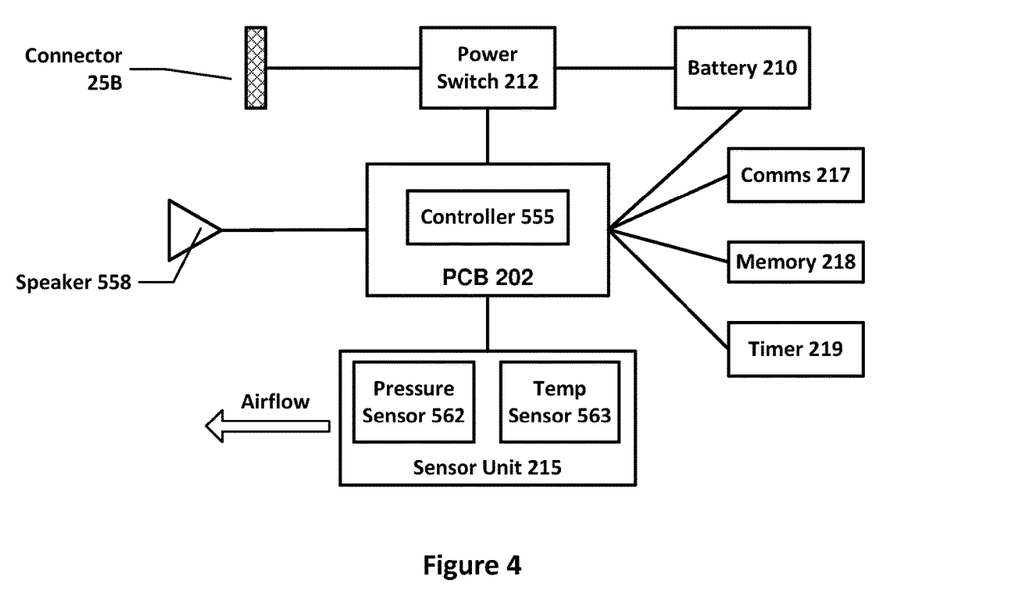
FIG. 4 is a schematic diagram of certain electrical components of the e-cigarette of FIG. 1 in accordance with some embodiments of the disclosure.

FIG. 4 is a schematic diagram of certain electrical (including electronic) components of the e-cigarette 10 of FIG. 1 in accordance with some embodiments of the disclosure. These components are generally located in the control unit 20, since this is a re-usable (rather than disposable) portion. However, in some embodiments at least, some of the electrical components may be located in the cartomizer 30.

As shown in FIG. 4, the control unit 20 includes an electrical (and mechanical) connector 25B (as discussed above), a power switch 212, a battery 210, a processor or (micro) controller 555, a non-volatile memory 218 (e.g. ROM), a communications interface 217, a timer (clock) 219, a speaker 558, and a sensor unit 215. The controller 555 is located on PCB 202, which may also be used for mounting other components as appropriate, e.g. sensor unit 215, power switch 212, and/or communications interface 217, depending upon the particular internal configuration of the control unit 202. Alternatively, these components may be located on one or more other PCBs (or other forms of mounting).

FIG. 4 illustrates some, but not necessarily all, of the electrical connections between the different components. For example, the sensor unit 215 may receive power from the battery 210 via its connection to the controller 555, or alternatively there may be a separate power connection from the battery 210 direct to the sensor unit 215 (not shown).

The sensor unit 215 is located in or adjacent to the air path through the control unit 20 from the air inlet to the air outlet (to the vaporizer). The sensor unit 215 includes a pressure sensor 562 and a temperature sensor 563 (also in or adjacent to this air path). Note that in some embodiments, there may be additional sensors (not shown in FIG. 4); also, the pressure sensor 562 and temperature sensor 563 may be provided as different devices (rather than being combined into a single sensor unit). The pressure sensor 562 may detect airflow by measuring a pressure drop caused by inhalation on the mouthpiece 35 (or alternatively the pressure sensor 562 may detect an inhalation by directly measuring airflow, analogous to an anemometer measuring wind).

The controller 555 includes a processor such as a CPU and memory (ROM and RAM). The operations of the controller 555 and other electronic components, such as the pressure sensor 562, are generally controlled at least in part by software programs running on the processor (or on the other electronic components as appropriate). Such software programs may be stored in non-volatile memory 218, which can be integrated into the controller 555 itself, or provided as a separate component (e.g. on PCB 202). The processor may access the ROM to load and execute individual software programs as and when required. The controller 555 also contains suitable interfaces (and control software) for interacting with the other devices, such as with the sensor unit 215.

The controller 555 utilizes the speaker 58 as an output device for producing audio signals to indicate conditions or states within the e-cigarette, such as a low battery warning. Different signals for signaling different states or conditions may be provided by utilizing tones or beeps of different pitch and/or duration, and/or by providing multiple such beeps or tones. Other forms of output device may be provided as well as or instead of the speaker 58. For example, as mentioned above the tip end 225 may be provided with a light emitting diode (LED) which may be used for signaling and/or ornamentation. There may also (or alternatively) be a light output at one or more other locations on the e-cigarette 10.

The communications interface 217 may be a wired or wireless connection to allow the e-cigarette 10 to communicate with an external device. For example, the communications interface 217 may support one or more of Bluetooth, Wi-Fi (the IEEE 802.11 family), and/or near field communications (NFC) for establishing wireless communications. Alternatively, or additionally, the communications link may support wired communications, potentially via connector 25B and/or some other communications facility. The communications interface may be used, inter alia, to allow an external device to provide and update control settings on the e-cigarette 10, and/or to retrieve status and usage information from the e-cigarette 10.

As noted above, the e-cigarette 10 provides an air path from the air inlet through the e-cigarette 10, past the pressure sensor 562 and the heater 365 (in the vaporizer), to the mouthpiece 35. Thus when a user inhales on the mouthpiece 35 of the e-cigarette 10, the controller 555 detects such inhalation based on information from the pressure sensor 562. In response to such a detection, the CPU supplies power from the battery or cell 210 to the heater 365, which thereby heats and vaporizes the liquid from the wick for inhalation by the user.

The battery 210 is linked to the heater 365 via a power switch 212 and connector 25B (plus connector 25A on the cartomizer 30). The power switch 212 supports the flow (and switching on/off) of the relatively large current supplied from the battery 210 in order to power the heater 365—this is typically of the order of 1 amp or more. The power switch 212 is controlled by the controller 555. For example, the controller 555 may close the power switch 212 in response to the pressure sensor 562 sensing an airflow through the e-cigarette 10, thereby allowing power to flow from the battery 210 to the heater 365. Conversely, the controller 555 may open the power switch 212 in response to the pressure sensor 562 sensing that the airflow through the e-cigarette 10 has now ended, thereby terminating the power flow from the battery 210 to the heater 365. In addition, the controller 555 may use switch 212 to implement a PWM scheme, as described above, to regulate the amount of power supplied from the battery 210 to the heater 365 during an inhalation.

It will be appreciated that the electrical configuration shown in FIG. 4 is provided by way of example only, and the skilled person will be aware of many potential variations. For example, some e-cigarettes 10 may not have a communications interface 217, while in other embodiments, the communications interface 217 may be combined, at least in part, with the controller 555.

The functionality of the controller 555 may be distributed across one or more components which act in combination as a controller. For example, there may be a PCB provided in combination with battery 210 to control re-charging of the battery 210, such as to detect and thereby prevent voltage or current overload and/or overly long charging, and likewise to control discharging of the battery 210, e.g. so that the battery 210 does not get excessively discharged to the point of damage.

Figure 5A:
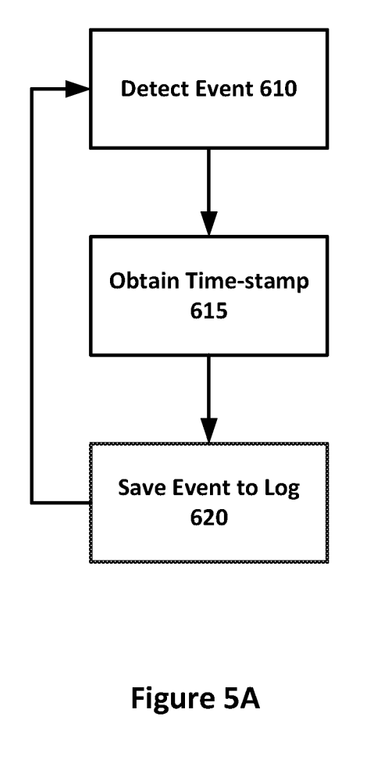
FIG. 5 is a set of flow charts illustrating various methods for recording, analyzing and exploiting usage data in accordance with some embodiments of the disclosure.

FIG. 5 is a flowchart illustrating the certain aspects of the e-cigarette 10 in accordance with some embodiments of the disclosure. The left-hand portion of this diagram (FIG. 5A) shows the processing involves the controller detecting an event (operation 610), obtaining a time-stamp for the event from timer 219 (unless this is provided with the event itself) (operation 615), and then saving information about this event (620), including the time-stamp and the nature of the event, to a log, which may be maintained in the non-volatile memory 218. This portion of the processing is then shown in FIG. 5A as looping back to the beginning, to indicate the ongoing, continuous nature of this event recording.

The e-cigarette 10 may record multiple different types of event into a log. For example, the e-cigarette 10 may treat an inhalation as an event, and record various information about the event—e.g. start time of the inhalation, duration of the inhalation, and the total energy utilized from the battery 210 to power the heater 365 during the inhalation. The latter parameter (energy) can be determined, for example, from the integral of voltage multiplied by current during the period of inhalation, which in turn might be obtained from a series of rapid measurements of the current and voltage during the inhalation. Alternatively, the amount of energy for an inhalation might be estimated, at least in part, e.g. based on the duration of the inhalation, the setting of any output level control, etc.

Similarly, the e-cigarette 10 may also record into memory 218 generally similar information about re-charging events—for example, start time of the re-charging, duration of the re-charging, and energy supplied to the battery 210 by the re-charging (this again can be determined by a series of voltage and current measurements, or just estimated). Note that the time(s) may reflect the period of actual re-charging rather than when the device is plugged into an external power supply (since the re-charging per se will end once the battery is fully charged).

Note that rather than recording a start time and duration for an event, another option is to regard starting and stopping as separate events—e.g. a first event to denote the start of re-charging, and a second event to denote finishing re-charging. The timer 218 may also supplied date information and/or day of the week information.

The e-cigarette 10 may also record at predetermined times (for example), the battery output level of battery 210. In addition, the e-cigarette 10 may record a wide variety of further types of events and/or parameter into the log, such as error states, operating temperature, etc. These other event/parameter types are less relevant for the processing of the present application, and will not be described herein.

TABLE 1

| Number | Time-stamp | Type | Parameters |
|---|---|---|---|
| ... | ... | ... | ... |
| 20140 | Date: time | End-charge | |
| 20141 | Date: time | Charge reading | Charge level |
| 20142 | Date: time | Begin-inhalation | Power setting |
| 20143 | Date: time | End-inhalation | Air volume |
| 20144 | Date: time | Begin-inhalation | Power setting |
| 20145 | Date: time | End-inhalation | Air volume |
| 20146 | Date: time | Lock device | |
| 20147 | Date: time | Unlock device | |
| 20148 | Date: time | Charge reading | Charge level |
| 20149 | Date: time | Begin-inhalation | Power setting |
| 20150 | Date: time | End-inhalation | Air volume |
| 20151 | Date: time | Begin-charge | |
| ... | ... | ... | ... |

Table 1 is an example of the information that may be stored into the log, as maintained in memory. This information is shown in the form of a table for ease of understanding, but the log may be based on any suitable data structure. Each row of the table corresponds to an event, and is associated with a unique event number, and a timestamp denoting date and time. In general there are different codes for each type of event, but for each of understanding, each event recorded in Table 1 is given a descriptive name. The first event is end-charge, representing the termination of charging. The second event is a measurement of battery charge level. Such measurements (and recording them into the log) may be performed on a predetermined timescale—for example every 15 minutes, and/or in response to various other events. For example, a battery charge level might be measured after every termination of charging (as shown in Table 1 above), and also whenever the device is unlocked, as described below.

The third and fourth events (as well as the fifth and sixth events, etc.) are detections of the start of inhalation and end of inhalation respectively. It will be appreciated that there may be many of these event pairs during a day. Table 2 also records the device being locked, which might occur automatically following a time-out period if the device is not used during the period (e.g. no inhalation detected during the period). Additionally or alternatively, the user might explicitly lock the e-cigarette, such as by pressing a particular button (or combination of buttons). Subsequently unlocking might then be performed by some appropriate manipulation (which might, for example, be difficult for children to perform), or perhaps by entering a suitable code into a smart-phone, which then sends an authorization signal to unlock the e-cigarette 10 via communications interface 217.

A final column in the Table above may be used to store ancillary information, e.g. parameters (if any) associated with a particular event—N.B. the type of event information stored will generally depend on the type of event. For example, a parameter for the charge reading event may denote the current voltage or charge level of the battery 210. A parameter for the begin-inhalation event might correspond to a power setting (which might be used to control how much vapor is to be produced for a given strength of inhalation). A parameter for the end-inhalation event might correspond to the volume of air inhaled, which may be measured or at least estimated by (for example) sensor unit 215.

It will be appreciated that the log structure shown in the Table is for illustrative purposes only, and many variations will be apparent for the skilled person. For example, an inhalation might be recorded as a single event, with the parameters for such an event providing information on the start time and duration of the inhalation. The event number may also be omitted if not required—for example, the time-stamp may uniquely identify each event (perhaps in combination with the event type).

Figure 5B:
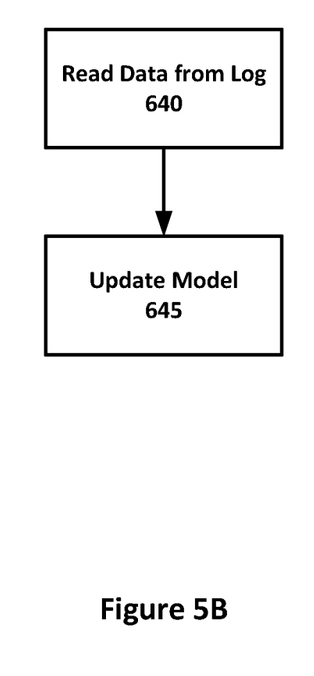

The middle portion of FIG. 5 (denoted FIG. 5B) illustrates one potential use of the log created in memory 218. In particular, event data (including parameters, etc.) is read out from the log (operation 640) and is used to update a model (operation 645) maintained by the controller. This model updating may occur on a continuous or periodic basis, and/or after certain specific events—e.g. the controller might favor updating the model when the e-cigarette is re-charging to avoid depleting the charge on battery 210 (and because the event rate may be lower). In most devices, the processing of FIG. 5B will run repeatedly, but with breaks between successive runs (in contrast to the ongoing loop of FIG. 5A). The model may be a single overall model, or may comprise of multiple component models In some implementations, the event data when generated may be applied directly, on an ongoing basis, to update the model (rather than being read back out of a log). Note that the event data might still be recorded into a log however, since this might (for example) still provide useful information—i.e. for diagnostics in case of some form of failure of the e-cigarette 10. Also, having a log of events separate from the model can help to reduce data access conflicts between saving new events to the log, and updating and exploiting the model. For example, one possibility is to copy recent events from the log to the model, perhaps at a time of low activity (e.g. at night), and therefore with minimal interruption to ongoing operation of the log to record new events. This then allows the log and model to be used in parallel, without conflict, at other times. A further possibility is for the log and model to run on different devices, as described in more detail below.

Figure 5C:
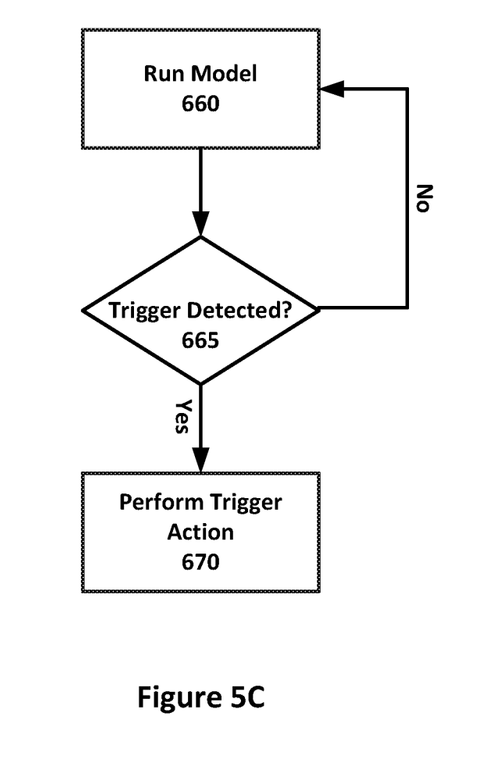

The right hand portion of FIG. 5 (i.e. FIG. 5C), relates to the exploitation of the model based on the (updated) data from the log in accordance with some embodiments of the disclosure. The model is run (operation 660), and the output of the model is then tested to see whether or not a particular trigger, i.e. a particular situation, is detected (operation 665). If not, processing loops back to the next time that the model is run (which may be on an ongoing or intermittent basis). However, if the trigger or condition is detected, then a suitable action (or actions) associated with this trigger or condition can be performed (operation 670). The processing can then loop back again to the next time the model is run.

The action of operation 670 may comprise making (for example) information available to the user, whether actively or passively (in the former, the user receives an explicit notification of the information becoming available; in the latter, the information is available if the user looks in the right place—which of course may already be known to them). The action may also comprise modifying one or more operating parameters or characteristics of the device, whether on a fully automatic basis, or else subject to some form of user confirmation.

In some implementations, the model itself may be located on another device (not on the e-cigarette 10 itself). In such circumstances, it will be appreciated that only some, but not all, of the operations shown in FIG. 5 would be performed on the e-cigarette 10, with the remaining operations being performed instead on the other device. Also, in some implementations, the processing of FIG. 5A may run in parallel with the processing of FIGS. 5B and 5C, however, the processing of FIGS. 5B and 5C may be alternatives if updating the model and running the model are separate, distinct operations. The processing of FIGS. 5B and 5C may be initiated according to a range of criteria. For example, data might be copied from the log to the model on a daily basis at a predetermined time (or regularly at some other time interval), or triggered by the accumulation of a certain number of new events in the log. A further example, if the model is not located on the e-cigarette 10 itself, would be to run the processing of FIG. 5B whenever the e-cigarette 10 is connected to the device responsible for the model. Likewise, the processing of FIG. 5C might run on a daily basis at a predetermined time (or regularly at some other time interval), or there may be some other initiating factor, again, such as a connection between the e-cigarette and the device responsible for the model. Further examples of initiating factors might be the power level dropping below a certain amount, or completion of a model update as per the processing of FIG. 5B.

FIG. 6 is an example of part of the analysis of usage data in accordance with some embodiments of the disclosure. This analysis of the data may be performed at operation 645 in FIG. 5B as part of updating the model with new usage data (operation 645). Alternatively, the analysis may be deferred until the model is run at operation 660, in which case updating the model may, for example, comprise loading new usage data into the model, but this new usage data might not be analyzed until the model is run at operation 660. A further possibility is to split the analysis, so that an initial portion is performed when updating the model (operation 645), and then the remainder is performed when the model is run (operation 660).

Figure 6A:
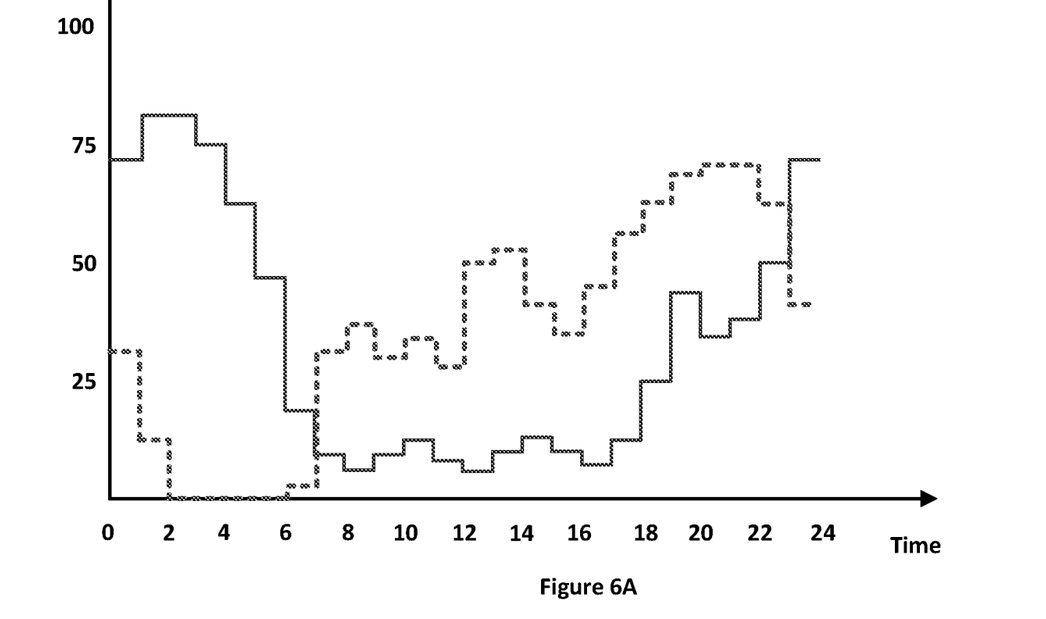
FIG. 6 is an example of part of the analysis of usage data in accordance with some embodiments of the disclosure.

In particular, FIG. 6A shows two types of average activity on a daily basis, with time of day represented along the x-axis using a 24 hour clock. The solid, black line in FIG. 6A illustrates re-charging, more particularly, the percentage of days that the device was re-charging at a given time. In other words, from the event information included in the log, the analysis determines, for each day, on an hourly basis, the number of days for which the e-cigarette was being recharged at this time (and conversely the number of days for which the e-cigarette 10 was not being re-charged at this time). It will be appreciated that these results can be derived in a straightforward manner from the event information recorded in the Table above (since the events record the date and time when charging starts and stops).

The results in FIG. 6A are shown as a percentage (as represented by the y axis), indicating the proportion of days for which the e-cigarette was being recharged at a given time. For example, during the main part of the day data, between 8 am and 5 pm (17:00), the device was relatively unlikely to be re-charging, typically only on between about 5 and 15% of the days. On the other hand, during the night, between about 1 and 4 am, the device was re-charging on a much higher proportion of the days (typically 70%-80%).

FIG. 6A also denotes the number of inhalations per unit time period, as represented by the short dashed—N.B. this line is shown in terms of an arbitrary scaling with regard to the y-axis, rather than the percentage scaling marked for the re-charging data. Again, it will be appreciated that this information can be readily obtained from the log information illustrated in the above table, by counting corresponding pairs of events for starting and stopping inhalation in the relevant time intervals. In general it can be seen that there is a low level of usage at night, a medium level of usage during the day, and a higher level of usage during the evening.

The plots illustrated in FIG. 6A may be utilized to run a usage model of the e-cigarette 10 as per operation 660. As an illustration, the re-charging information may be used to estimate the most likely time until re-charging occurs. For example, if the current time is midday (12), it may be estimated that the next re-charging will not be until 10 pm (22:00), since it is only at this point that the probability of re-charging rises to 50%, the probability being directly based on the historical frequency information. (This is a fairly basic method of estimating the next re-charging time; more refined approaches are discussed below). Furthermore, the inhalation information of FIG. 6A may be used to estimate the number of inhalations over the next 10 hours, i.e. between the current time and the estimated time of re-charging. This estimated number of inhalations can be converted to an expected total power usage, e.g. based on a predetermined, standard energy usage per inhalation, or a measured energy usage per inhalation. The model can then determine whether the remaining charge on the battery is sufficient to supply this expected total power usage.

If the remaining charge on the battery 210 is greater than the expected total power usage (typically by a threshold amount), then the trigger detection at operation 665 in FIG. 5C would have a negative outcome—this would generally represent a normal, acceptable situation. However, if the expected total power usage is greater than (or not comfortably less than) the remaining charge on the battery 210, the trigger detection at operation 665 in FIG. 5C would have a positive outcome, lead to performing trigger action at operation 670.

The trigger action comprises one or more actions arising from the trigger detection. One possible action in this situation is to issue a notification or warning to the user of the prediction that the battery 210 does not have adequate charge for likely usage. Note that this is different from a conventional "low battery" warning, since the latter typically occur when the remaining charge on a battery 210 falls below a specified amount. In contrast, a warning that the battery does not have an adequate charge for likely usage may occur while there is still substantial charge on the battery (above the level for a conventional "low battery warning"), if there is expected to be a significant time interval until the next predicted re-charging.

The notification may take any appropriate form, depending upon the available facilities of the e-cigarette 10. For example, the e-cigarette 10 may provide a particular audio warning (one or more beeps) via speaker 558, or set one or more indicator lights. Another possibility is to set an internal status which can then be detected over communications interface 217, e.g. by using an app on a smartphone, and the app then provides the relevant notification to the user. Note that the form of the notification may vary according to the severity or estimated likelihood of the e-cigarette running out of charge. For example, if the expected usage is significantly above the battery charge level, the notification may be pushed more assiduously than if the expected usage is marginally below the battery charge level—e.g. an alarm status is made available to a smartphone app in both cases, but an audio or light notification on the e-cigarette itself is only provided in the former case, where the expected usage is significantly above the battery charge level. In response to the notification or warning, the user may choose some appropriate action, for example, actively seeking an earlier opportunity to re-charge the e-cigarette and/or scaling back their usage of the e-cigarette.

Another form of trigger action at operation 670, which may be adopted instead of or in addition to the user notification described above, is to reduce power consumption levels. This reduction in power consumption levels may be performed by controller 555 itself, or instructed by an external mechanism (such as a smartphone app), or by a combination of both. In addition, the reduction in power consumption levels may be performed automatically, or may, at least in part, first require confirmation or instruction from a user. Examples of mechanisms for reducing power consumption are: if the e-cigarette illuminates during an inhalation, turn off such illumination, or reduce the period and/or intensity of the illumination; reduce the power level supplied to the heater during an inhalation, and/or reduce the time for which power is supplied. Also, if the e-cigarette 10 has a "sleep" mode with generally lower levels of power consumption, the e-cigarette 10 may transition more quickly to this lower level power mode (after a shorter period of non-use).

It will be appreciated that the model described above for power usage is relatively simple, and more sophisticated models can readily be employed, e.g. by having a model which is probability based. For example, we can define t as the time interval from the current time until the next recharge commences, where $0<t<T$, with T being some maximum likely time until the next re-charge. We define a probability (density) distribution for t, denoted as p(t), where $\int p(t) \, dt$ between 0 and T is 1 (assuming the e-cigarette will definitely be recharged within time T). Thus p(t) represents the probability of having to wait time t (no more, no less) until the next recharge occurs.

We can use the plot of FIG. 6A to derive an estimate for the distribution of p(t). Note that this distribution will generally be dependent upon the current time of day—for example, re-charging is likely to start sooner (with a lower value of t) in the evening than in the morning. Another way of estimating the distribution of p(t), rather than using the data of FIG. 6A, would be to look only at the timing of the events representing the starting of charging (such as represented by the final event in the above table). For example, if the current time is 3 pm (15:00), we can look at the events on a daily basis, and count the number of days for which the next start re-charging event was within 1 hour (t=1) of 3 μm, the next start re-charging event was within 1-2 hours (t=2) of 3 μm, the next start re-charging event was within 2-3 hours (t=3) of 3 μm, and so on (discounting days when re-charging was already in progress at 3 pm). We can then convert this relative frequency information into the probability distribution p(t).

Once we have p(t), one approach is to estimate the time until the next re-charging according to ∫p(t)·t dt between integral limits 0 and T—this is the standard formula for the expected value of t (denoted E[t]). Assuming we do wait for a time period E[t] until the next re-charging, we can then follow the approach described above for determining whether or not the expected power usage over this period E[t] exceeds the charge capacity remaining in the battery.

A further refinement is that rather than using the expected value E[t] for assessing the risk of the battery being exhausted, we can use the probability distribution p(t) directly. Thus if the total charge level on the battery is currently C, and the expected power usage in the next time t (starting from the current time) is E[P(t)], the probability of battery depletion (Prob) can be determined as:

Prob=∫p(t)·kdt (integral for 0<t<T)

where k=1 if E[P(t)]>C, and k=0 otherwise. Note that since E[P(t)] is necessarily an increasing (or at least, non-decreasing) function with respect to increasing t (the e-cigarette only consumes power), then if we define t' as the value of t for which E[P(t)]>C, the above expression can be re-written as:

Prob=∫p(t)dt (for 0<t<t')

In such a situation, we can consider the model as incorporating the distribution of start times for the next re-charge and the rate of expected usage (based on inhalations), as derived from the log data, including the dependency on current time. The model is then supplied with present status parameters (namely current time and battery charge level), which serve as inputs to the model to determine the probability specified above. The trigger detection of operation 665 may then produce a positive outcome if the determined probability exceeds a certain threshold. One possibility might be to have a "traffic light" system in which a probability of 30% or less is regarded as "green", a probability of battery depletion of between 30% and 65% is regarded as "amber", perhaps with an appropriate notification to the user, and a probability of battery depletion of above 65% is regarded as "red", with a more significant (e.g. more frequent or direct) notification to a user, and perhaps the automatic implementation of power saving measures as discussed above.

Accordingly, the skilled person will understand that although the inhalation information shown in FIG. 6A in effect just depicts an average or mean value, the full log data allows various probability distributions (and/or multiple parameters thereof) to be determined. For example, while FIG. 6A indicates that a certain number of inhalations occurs on average at (say) 8 am, the log data can be used to derive the distribution around this average value (what is the minimum value, the maximum value, spread, etc.). This then allows the estimated power energy usage to be represented as a probability distribution. In this case, rather than having k=1 if E[P(t)]>C, and k=0 otherwise, k can now represent the probability that the estimated power usage (according to the observed distribution from the log events) exceeds the remaining charge (for each specified value of t).

Furthermore, the duration of inhalations (and hence the power consumed by each inhalation) may itself vary according to a distribution (and the distribution may vary with time of day, etc.). Again, the log information allows such a distribution to be determined, and this again allows a more sophisticated probability model for estimated power usage to be developed and exploited.

It will be appreciated that the analysis described above represents just some examples of a model based on the collected information, and many others will be available. For example, the usage patterns shown in FIG. 6A may be specific to a working day, and a separate model may be developed for a weekend (or individually for Saturday and Sunday).

Figure 6B:
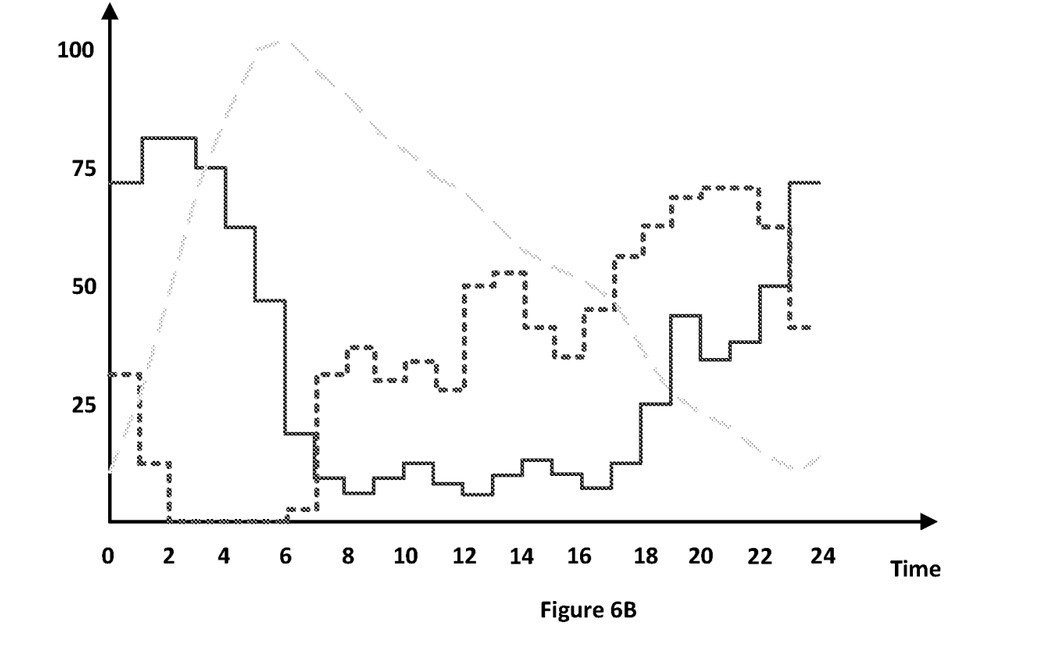

FIG. 6B again provides an example of part of the analysis of usage data in accordance with some embodiments of the disclosure. FIG. 6B shows the same data as FIG. 6A, but supplemented with a line representing (average) measured charge level for the battery, shown in large dashes. (This line is plotted in FIG. 6B as a continuous curve, rather than as discrete blocks, solely for ease of visual distinction from the two lines of FIG. 6A; the skilled person will choose whichever representation of the data is most appropriate in the given circumstances.) Again, the measured charge level can be directly obtained from the table of log events presented above. In practice, the charge level tends to rise overnight (the most common time of re-charging), and then drop during the day (the most common time of usage). As for the inhalation figures, the line shown in FIG. 6B for the battery charge level indicates an average value, but there is an underlying distribution from the measurements on different days, and this distribution can also be exploited in any analysis.

It will be appreciated that the average charge level, shown as a percentage of the full battery level, is dependent largely on both re-charging times and also inhalation, hence there is a close inter-relationship between the three lines plotted in FIG. 6B (the battery charge level is also impacted by other electrical operations within the e-cigarette, but generally the power supplied to the heater for inhalation is the most significant usage factor). Consequently a model might be based on any two of these parameters, rather than all three (although using all three would help provide the best accuracy).

The models described herein can be based on a wide range of statistical and computing structures of varying sophistication, such as principle component analysis (PCA), correlation models, neural networks, etc. For example, the model may show from the usage data that number (or duration and/or strength) of inhalations are correlated not only with time, but also with specific day of the week, as well as immediate past usage of the e-cigarette—for example, heavier usage (than average) during the afternoon might tend to be followed by lighter usage (than average) in the evening. These correlations, etc., can then be exploited by the model to give a more accurate estimate of the (distribution of) expected energy usage.

Note that the model may refine itself with increasing usage of the device. For example, at a given point in time, the model may predict a certain expected usage over a set time period. The actual usage over this time period (as subsequently recorded in the log) may then be accessed and compared with the prediction. If the prediction is discrepant from the actual usage, this can be used to help refine and improve the model via any suitable machine learning technique.

As noted above, the model may be implemented on the e-cigarette 10 itself, and/or on an external device, such as a smartphone or tablet computer. The external device connects to the e-cigarette via interface 217 to read the log data (operation 640) in order to update the model accordingly (operation 645). The results of running the model on the external device may be presented directly from the device to the user (it will be appreciated that the user interface of a device such as smartphone is typically much more powerful than for an e-cigarette, e.g. with a touch-screen interface, etc., and such a device generally also has much more processing power). The results of running the model may also be loaded back to the e-cigarette, possibly in the form of instructions to adopt power-saving measures.

A further possibility is that the model itself is maintained on a server accessible by the external device (and/or possibly the e-cigarette) over the Internet or other appropriate network. In this case, the usage data may be uploaded to the server for analysis and modeling (somewhat akin to uploading position tracking data from a GPS device for analysis).

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein. The disclosure may include other inventions not presently claimed, but which may be claimed in future.

The invention claimed is:

1. A control unit for an electronic vapor provision system, the control unit comprising:
   a battery for providing electrical power to a heater which is used to produce vapor; and
   a controller configured to:
   control the electrical power provided by the battery to the heater during user operation of the electronic vapor provision system;
   determine power consumption from the battery due to operation of the heater to produce vapor;
   collect information, during user operation of the electronic vapor provision system, relating to: (i) the power consumption from the battery due to operation of the heater to produce vapor, and (ii) re-charging of the battery,
   maintain a model of power consumption from the battery by the electronic vapor provision system and timings of re-charging the battery, wherein the model is formed or updated from the collected information, and
   predict from the model whether an estimated power consumption from the battery by the electronic vapor provision system will discharge the battery down to a threshold level of charge before an estimated next re-charging time of the battery, and if so:
   perform a mitigation action by controlling power level supplied to the heater or reducing time that power is supplied to the heater to reduce the power consumption from the battery by the electronic vapor provision system in response to the prediction.

2. The control unit of claim 1, wherein the information is collected in a log of events.

3. The control unit of claim 2, wherein the events monitor at least a start time and a stop time of (i) inhalation and (ii) re-charging.

4. The control unit of claim 1, wherein the model provides an expected value of time until the estimated next re-charging time.

5. The control unit of claim 4, wherein the model further provides a probability distribution of time until the estimated next re-charging time.

6. The control unit of claim 4, wherein the model uses collected information regarding start time of re-charging for determining the expected value of time until the estimated next re-charging time.

7. The control unit of claim 1, wherein the model provides an expected power consumption before the estimated next re-charging time of the battery.

8. The control unit of claim 7, wherein the model further provides a probability distribution of power consumption until the estimated next re-charging time of the battery.

9. The control unit of claim 1, wherein at least one of the estimated power consumption or the estimated next re-charging time is provided as a probability distribution.

10. The control unit of claim 9, wherein the prediction is determined by summing or integrating over the probability distribution for at least one of the estimated consumption or the estimated next re-charging time.

11. The control unit of claim 9, wherein the prediction provides a probability that the battery is discharged to a given discharge level, for each of multiple different given discharge levels.

12. The control unit of claim 11, wherein an assessment of whether the battery will be discharged to the threshold level takes into consideration the predicted probability that the battery will be discharged to the threshold level.

13. The control unit of claim 12, wherein the threshold level is specified based on a combination of charge level for the battery and predicted probability of discharging down to the charge level.

14. The control unit of claim 1, wherein the model is provided with a current time to make the prediction.

15. The control unit of claim 1, wherein the model is provided with a current charge level of the battery to make the prediction.

16. The control unit of claim 1, wherein the threshold level of charge is set at one of approximately 20%, 10% or 5% of a maximum battery charge level.

17. The control unit of claim 1, wherein the threshold level of charge is set such that the charge of the battery is depleted below a minimum charge level for allowing the heater to produce vapor.

18. The control unit of claim 1, wherein the collected information about power consumption from the battery due to operation of the heater to produce vapor comprises information about inhalations using the electronic vapor provision system.

19. The control unit of claim 18, wherein the collected information about inhalations specifies a duration of each inhalation.

20. The control unit of claim 18, wherein the information about inhalations specifies a strength or power supplied for each inhalation.

21. The control unit of claim 1, wherein the controller is further configured to perform a user notification in response to the prediction.

22. The control unit of claim 1, wherein there are at least a first threshold level of charge and a second threshold level of charge, and wherein the mitigation action varies according to whether the battery is predicted to discharge down to the first threshold level of charge or the second threshold level of charge.

23. The control unit of claim 22, wherein the first threshold level of charge is higher in charge level than the second threshold level of charge, and the mitigation action is only performed if the battery is predicted to discharge down to the second threshold level of charge.

24. An electronic vapor provision system including the control unit of claim 1.

25. The control unit of claim 1, wherein the controller is configured to record a battery output level of the battery at predetermined times to collect the information, during user operation of the electronic vapor provision system, relating to: (i) the power consumption from the battery due to operation of the heater to produce vapor, and (ii) re-charging of the battery.

26. A method of operating a control unit for an electronic vapor provision system, the control unit including a battery for providing electrical power to a heater which is used to produce vapor, and a controller, the method comprising, by the controller:

controlling the electrical power provided by the battery to the heater during user operation of the electronic vapor provision system;

determining power consumption from the battery due to operation of the heater to produce vapor;

collecting information, during user operation of the electronic vapor provision system, relating to: (i) the power consumption from the battery due to operation of the heater to produce vapor, and (ii) re-charging of the battery;

maintaining a model of power consumption from the battery by the electronic vapor provision system and of timings of re-charging the battery, wherein the model is formed or updated from the collected information;

predicting from the model whether an estimated power consumption from the battery by the electronic vapor provision system will discharge the battery down to a threshold level of charge before an estimated next re-charging time of the battery, and if so:

performing a mitigation action by controlling power level supplied to the heater or reducing time that power is supplied to the heater to reduce the power consumption from the battery by the electronic vapor provision system in response to the prediction.

\* \* \* \* \*